May 19, 1942.      F. R. GONSETT      2,283,752
EYE SHIELD
Filed May 10, 1940
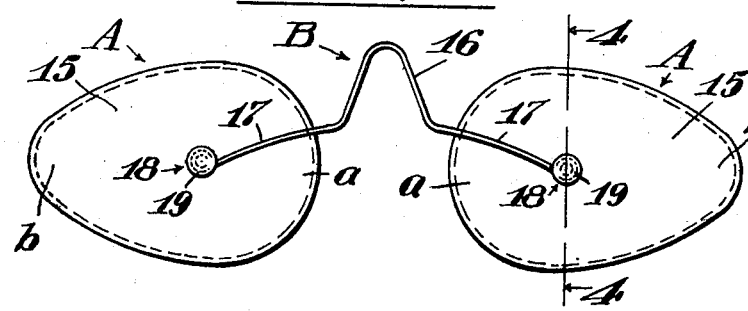
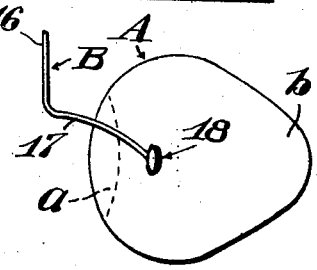
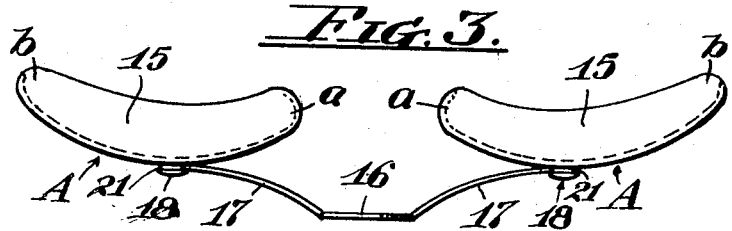
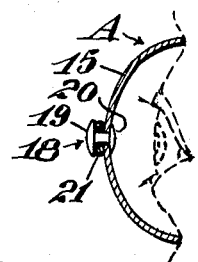
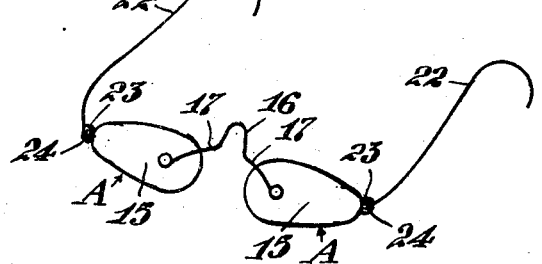
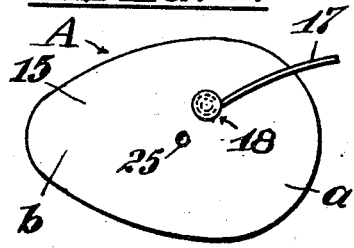
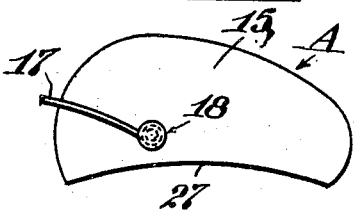
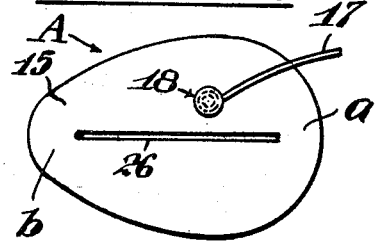
Inventor
*Faust R. Gonsett;*
By *R. S. Burry*
Attorney Patented May 19, 1942

2,283,752

UNITED STATES PATENT OFFICE 2,283,752

EYE SHIELD

Faust R. Gonsett, Los Angeles, Calif.

Application May 10, 1940, Serial No. 334,304

2 Claims. (Cl. 2—15)

This invention relates to an eye shield and has as its primary object the provision of a means for protecting the eyes of a person while sun bathing and to which end embodies a pair of eye shielding elements that are so formed and arranged as to be readily applied over the eyes and when applied will adequately exclude such sun's rays as might occasion sun burn.

Another object is to provide an eye shield which is adapted to protect the eyes from the wind as well as from the sun.

Another object is to provide an eye protective shield of the above character which while affording adequate protection of the eyes from wind and sun will permit exposure of all portions of the face except the eye lids and immediate contiguous portions thereof covering the eye balls.

Another object is to provide an eye protective shield element which is adapted to be stamped, pressed or molded to shape and thereby be economically produced, and which may be readily equipped with a suitable mounting according to requirements.

A further object is to provide an eye protector element which is so marginally shaped as to be conformable to the facial contours contiguous the eyes, whereby it may be held in place over the eye by the muscular and fleshy structure of the portion of the face surrounding the optical cavities.

With the foregoing objects in view, together with such other objects and advantages as may subsequently appear, the invention is carried into effect as illustrated by way of example in the accompanying drawing in which:

Fig. 1 is a front view of the eye shield showing a preferred embodiment of the invention;

Fig. 2 is an end view of the structure shown in Fig. 1;

Fig. 3 is a plan view of the structure shown in Fig. 1;

Fig. 4 is a detail in section taken on the line 4—4 of Fig. 1 showing the manner of seating the eye shielding element on the face;

Fig. 5 is a perspective view of the eye shield depicting a modified form of the mounting therefor;

Fig. 6 is a perspective view showing the eye shield elements as applied when a mounting therefor is not desired;

Fig. 7 is a detail in elevation of the eye shield element showing it as provided with a circular sight opening;

Fig. 8 is a view in elevation of one of the shield elements showing it as provided with an elongated sight opening;

Fig. 9 is a detail in elevation of a modified form of the shield depicting it as formed to provide a partial shield.

Referring to the drawing more specifically, A indicates generally an eye shield element which embodies a cup-like shell 15, which shell is formed of thin stiff sheet-like material, and which may be formed of any suitable material such as metal, plastic, and fibrous materials, and which may be pressed, stamped or molded to shape according to the character of material employed in its manufacture. While the shield is preferably opaque so as to effect complete exclusion of light rays, it may in some instances be translucent.

The essence of the invention resides in contouring the shield A so that its margin will substantially conform to the surface contours of the portion of the face of a person bordering the eye socket, and so that the body portion thereof will protrude outwardly from its margin in such fashion as to extend in spaced relation to the eye when the margin of the shield is seated on the portion of the face surrounding the eye.

To this end the shield A is of general ovoid shape in outline as viewed from the front or back thereof, with the enlarged end portion *a* adapted to be presented toward the nose of the wearer and with the reduced end *b* thereof extended slightly over the outer side margin of the eye socket as shown in Fig. 6, is arcuate in the direction of its length as shown in Fig. 3, and is segmental in cross section as shown in Fig. 4. The shield is formed in rights and lefts so that a pair thereof will accommodate both eyes.

The shield element A is thus formed and is so dimensioned that it may be positioned over the eye of a person and gripped by the muscular structure of the eyebrow, as shown in Figs. 4 and 6, and whereby it may be employed without other means of support. However, it is desirable in some instances to provide a mounting for a pair of the shield elements, such for example as shown in Figs. 1, 2, 3, and 5, which mounting embodies a spring wire nose clip B here depicted as embodying an intermediate upstanding nose engaging member 16 of general inverted U-shaped form the leg members of which connect with rearwardly and downwardly arched end members 17 the terminals of which overlie the outer faces of the pair of shield elements and are secured thereto by rivets 18 which pass through the shield and have headed ends 19 and 20 that engage respectively with a loop 21 at the terminals of the end members and with the inner face of the shield as shown in Fig. 4.

The spring clip B while being resilient is capable of being bent so that it may be manipulated into a form and position to fit the nose of the individual to which the clip is to be applied, and also to space and position the shields A according to the requirements of the individual.

In some instances the clip B may be inadequate to properly support the shields on a person's face, and accordingly the shields may be equipped with conventional ear engaging bows 22 as shown in Fig. 5; the bows 22 being here shown as attached by pivots 23 to yokes 24 carried on the outer ends of the shields.

While the shields are preferable imperforate so as to totally exclude wind and sun when opaque, there are occasions when it will be desirable to form the shield elements with sight openings, such as a miniature circular orifice 25 as shown in Fig. 7, or an elongated narrow slot 26 as shown in Fig. 8, and furthermore it may be desirable in some instances to provide a partial shield by elevating the lower margin thereof as indicated at 27 in Fig. 9.

In the application and operation of the invention, when it is desired to protect the eyes against wind and sun, the eye shields are placed over the eyes as shown in Figs. 4 and 6, either with or without the mounting or clip B, so as to cover the eyes with the centered portions of the shields spaced therefrom and with the margins of the shields seating on the face at or contiguous the base portions of the eyelids.

Where the nose engaging clip B is employed, it is tensioned so that the intermediate portion 16 will lightly grip the nose and the end portions will exert a light inward pressure against the shields so as to securely and effectively hold the shields in their seated position on the face under a slight pressure.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. A shield for protecting the eyes against wind and sun, comprising an ovate shell arcuate longitudinally, and segmental transversely, and having a margin contoured to substantially conform to the surface portions of the face at the base portion of the eye lids, a spring wire nose engaging clip for connecting a pair of said shells, and means for securing the ends of said clip to points adjacent the central portions of said pair of shells.

2. A shield for protecting the eyes against wind and sun comprising an ovate shell arcuate longitudinally, and segmental transversely, and having a margin contoured to substantially conform to the surface portions of the face at the base portion of the eye lids, a spring wire nose engaging clip having an intermediate inverted U-shaped portion and oppositely extending end portions leading from the legs of said intermediate portion to a pair of said shells, and means fastening the terminals of the end portions of said spring wire to the outer intermediate portions of said shells at points spaced well inwardly from the margins of said shells.

FAUST R. GONSETT.